United States Patent [19]

Clark et al.

[11] Patent Number: 4,477,833

[45] Date of Patent: Oct. 16, 1984

[54] METHOD OF COLOR CONVERSION WITH IMPROVED INTERPOLATION

[75] Inventors: David A. Clark, Streamwood; David C. Strong, Lynwood; Thomas Q. White, II, Chicago, all of Ill.

[73] Assignee: R. R. Donnelley & Sons Company, Chicago, Ill.

[21] Appl. No.: 489,151

[22] Filed: Apr. 25, 1983

Related U.S. Application Data

[63] Continuation of Ser. No. 292,293, Aug. 12, 1981, abandoned.

[51] Int. Cl.³ .............................................. G03F 3/08
[52] U.S. Cl. ......................................... 358/80; 358/78
[58] Field of Search ....................... 358/80, 78, 75, 22; 364/723

[56] References Cited

U.S. PATENT DOCUMENTS

4,275,413  6/1981  Sakamoto ............................. 358/80
4,334,240  6/1982  Franklin ................................ 358/80

Primary Examiner—Tommy P. Chin
Attorney, Agent, or Firm—Wood, Dalton, Phillips, Mason & Rowe

[57] ABSTRACT

An apparatus for converting a color image from one color space to another color space includes a memory in which is stored a finite number of output signals which represent colors in the output space and which is addressed by signals representing a color in the input space. In order to derive an output color value for an input color located between colors stored in the memory, an interpolation process is utilized. The interpolation process takes into account the four closest color values in the memory above and below the input color and develops an interpolated output color value from vectors derived from the four color values.

15 Claims, 8 Drawing Figures

METHOD OF COLOR CONVERSION WITH IMPROVED INTERPOLATION

This is a continuation of application Ser. No. 292,293 filed Aug. 12, 1981, now abandoned.

BACKGROUND OF THE INVENTION

This invention relates generally to color correction, and in particular to a method for performing color correction to allow for visually exact duplication of colors in systems of color input and output devices, where each device may have different color representation capabilities.

While most color correction is today done in film or using analog devices which themselves add distortions to the color result, the method of digital color control and correction as described herein affords for the first time a practicable capability of accurately controlling different color handling characteristics to achieve visually exact duplication of color input and output.

A page containing colors to be reproduced is typically sensed by a color separation scanner which breaks up the page into a number of discrete pixels, each of which is analyzed to determine its color content. The scanner provides color information in terms of three primary colors which represent the components of the sensed color in a three dimensional space.

Generally, it would be possible to use the output from the scanner to reproduce colors in the output devices or the printed page if the filters used by the scanner were perfect, the color handling characteristics of the output devices were identical, and the inks used in the printing process were perfect colors and were linear over the dynamic range of the ink values, and if the paper used in printing were perfectly white. In practice, however, filters are not capable of perfectly separating colors, color handling capabilities such as amount of available resolution varies widely among output devices, and inks and papers vary from the ideal. Consequently, it has been found necessary to correct the color values generated by the scanner to account for these and other factors which affect the colors reproduced in intermediate output devices such as a CRT or by final output devices used in printing the final copy.

This correction may be performed by loading a memory with the corrected color values corresponding to all visually discernible combinations of input color component values and by using the output of the scanner to address this memory.

However, the domain of all possible input color component combinations must be made quite large so that a wide range of colors can be reproduced, e.g., on the order of $2^{24}$ possible combinations, and hence the memory must contain a like number of memory positions so as to be capable of providing a corrected color value for each combination of input color components. Obviously, such a large memory is prohibitively expensive.

An attempt at solving this problem has been made by storing the corrected color values for only a fraction of the total number of input color combinations. A corrected color value for those input color combinations not having a corresponding corrected value in the memory is derived by interpolating along the three axes between two of the values stored in the memory. However, this type of interpolation process along the three axes produces discontinuities in the gray scale when the color increments along the three axes are not equal, resulting in the introduction of errors in the color correction process.

SUMMARY OF THE INVENTION

In order to overcome the above noted difficulties, the memory or map table is loaded with the corrected values of only a fraction of the total number of input colors. For example, the map table may contain corrected values for 4096 colors which are evenly spaced within a color space, thereby permitting the use of an inexpensive memory.

A corrected color value for each point in the color space which lies between points stored in the memory is derived by using an interpolation process.

The process performs an interpolation between the corrected color values in the map table on the basis of the relative values for each color component of the difference between the input color and the points stored in the map table.

This type of interpolation process results in an apparatus having color reproduction capability which is optically equivalent to the capability of systems utilizing large memories which store corrected color values for each optically discernible input combination, but accomplishes this result in a far more practical manner.

BRIEF DESCRIPTION OF THE DRAWINGS

FIG. 4b is an enlarged view of a portion of FIG. 4a;

FIG. 5b is a representative diagram of an output color space in the example shown in FIG. 5a.

DESCRIPTION OF THE PREFERRED EMBODIMENT

Figure 1:
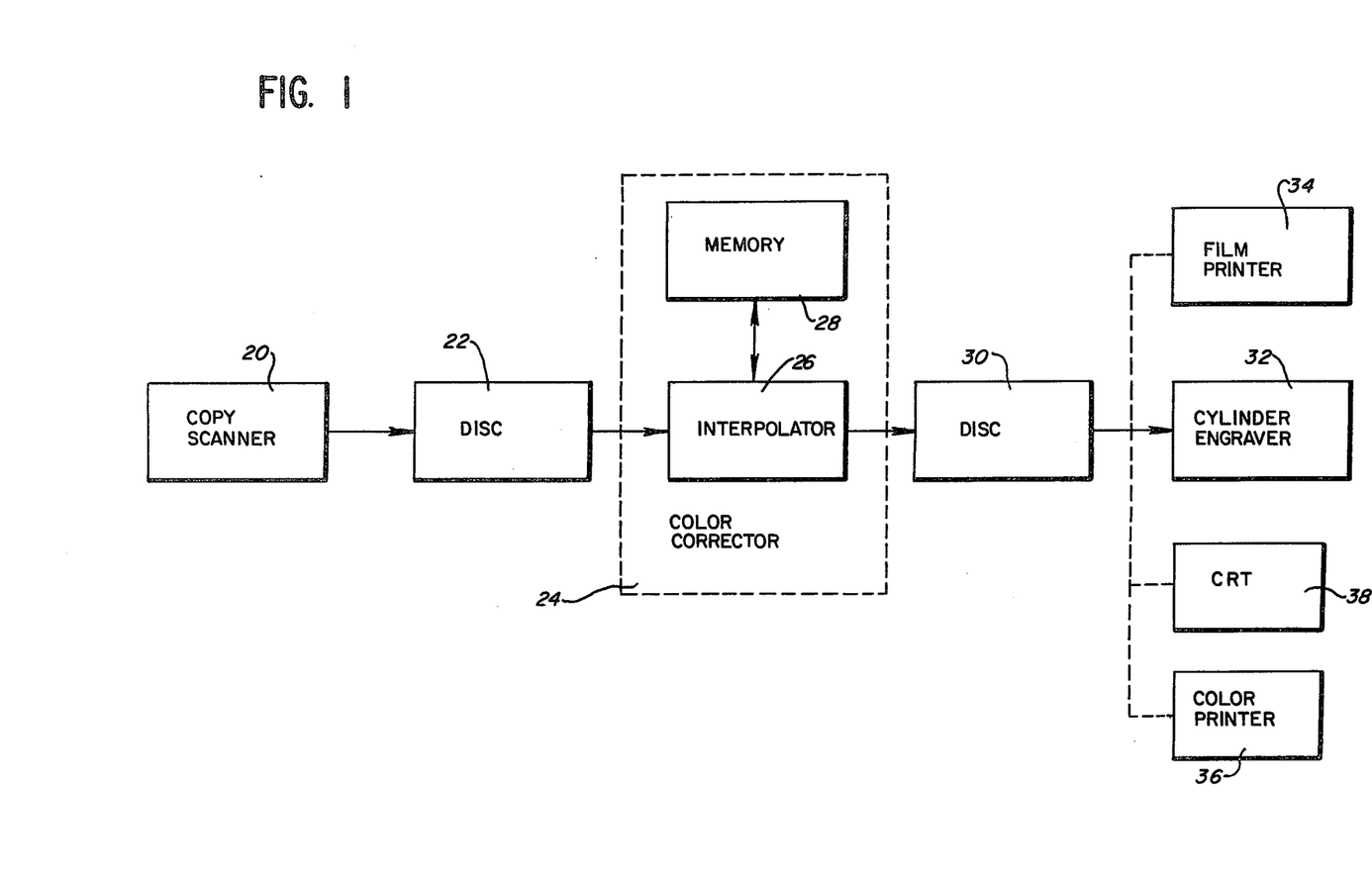
FIG. 1 is a block diagram of a system for accomplishing direct engraving of a rotogravure cylinder or other output from a scanned copy, which uses the color correction method of the present invention.

Referring to FIG. 1, there is illustrated a block diagram of a system for scanning and reproducing a color image. Source copy, as a picture, is sensed by a color separation scanner 20 which breaks up the page into a number of discrete pixels, each of which is analyzed to determine its color content. The pixel color information from the scanner is transferred to a storage disc or other storage device 22.

Alternatively, the color information may be sensed by a camera which utilizes a plurality of charge coupled devices (CCD's) to develop a serial input to the storage disc 22.

The information stored on the storage disc 22 is then "read" one pixel at a time by a color corrector 24 which includes an interpolator 26 and a memory 28.

A plurality of corrected color values are stored in the memory 28; however, as before noted, it is prohibitively expensive to use a memory large enough to accommodate sufficient color values for reproduction of all perceptible variations.

Accordingly, the memory stores the corrected color values for only a limited number of input colors. In order to develop a corrected color value for those input color values not having a corrected value in the memory, the interpolator 26 utilizes the corrected color values of the four closest input color values to the color value received from the disc 22 in an interpolation process, such process being more fully described hereinafter.

The output of the color corrector 24 is then transferred to a second storage disc 30. The output signal from the disc 30 may be used to control a cylinder engraver 32 which produces cylinders suitable for a rotogravure printing process. The output signals may also be used with other printing systems. For example, a film printer 34 may print four black and white films representing yellow, magenta, cyan and black, in either half tones or continuous tone used in preparing plates for letter press, offset or gravure printing.

The output from the disc 30 may also be used to drive output devices such as a color printer 36, a cathode ray tube 38 or the like to enable inspection of the final copy without the necessity of engraving a cylinder.

Figure 2:
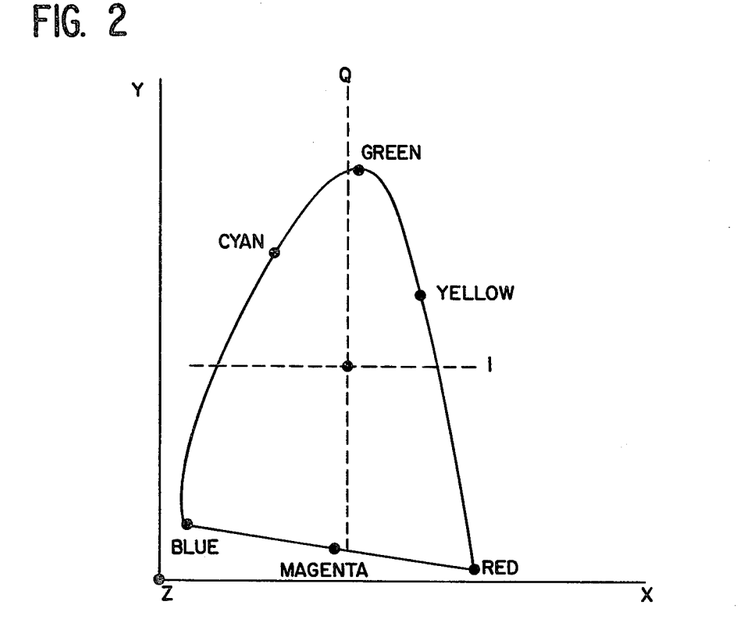
FIG. 2 is a chromaticity diagram illustrating a particular color space.
Figure 3:
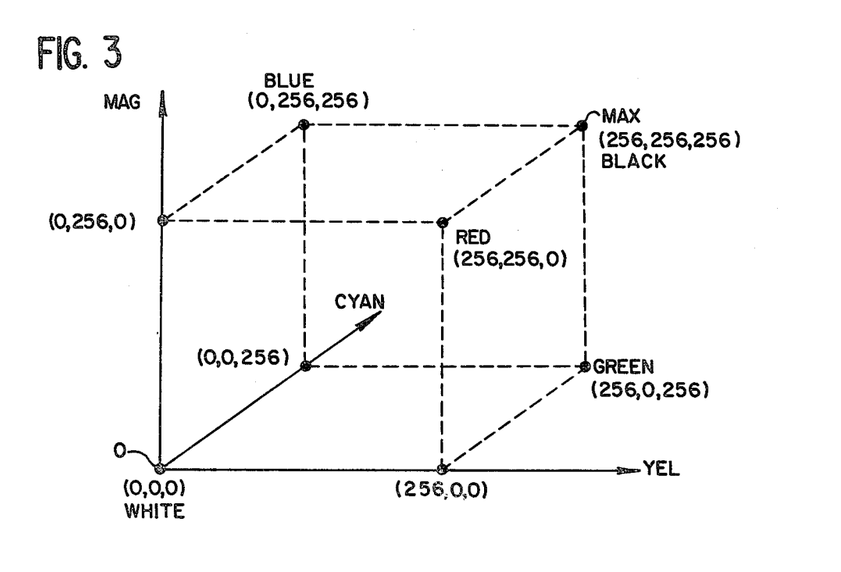
FIG. 3 is a diagram representing a second type of color space.

Referring now to FIGS. 2 and 3, a brief description of two types of color spaces used to represent colors will be given to assist in understanding the invention.

The space represented in FIG. 2 is a chromaticity diagram illustrating the distribution of the three light primary colors of red, green and blue, and the complements of these colors, i.e., cyan, magenta and yellow, respectively, which are referred to as the printing primary colors. The chromaticity diagram is shown as being superimposed on two separate coordinate axes, designated the YIQ (dashed lines) and the xyz (solid lines) coordinate systems.

The origin of the YIQ system is shown as the intersection of the I and Q axes, with the Y axis extending perpendicular to the plane of the paper. In general, points lying on the curve, e.g., green, represent fully saturated colors. Values located inside the curve are colors which are less saturated than those lying on the curve, such colors tending towards grayness the closer the point is to the origin. At the origin, there are equal contributions of all colors, and hence a gray "color" results.

The Y axis of the YIQ system represents the brightness of the color. For example, increasing values in the Y direction (i.e., increasing distance upwardly from the plane of the page) result in lighter colors than those present at a lower value. Conversely, the lower the Y value for a particular color, the darker the color is.

Complementary colors are those colors which lie on a straight line which passes through the origin in a particular Y plane.

The xyz coordinate system is similar to the YIQ system, the primary difference being that the origin of the xyz system is translated relative to the origin of the YIQ system so that all values of x and y are positive.

Referring to FIG. 3, a second type of color space is defined by a set of three axes in a cartesian coordinate system. Each axis is subdivided into 16 units or major divisions and each major division is in turn divided into 16 subunits or minor divisions. The color space is therefore divided into $16^3$, or 4096 separate subspaces, each subspace in turn containing 4096 points, each of which uniquely identifies a particular color acccording to its color values along the three axes.

Each of the three axes may be thought of as representing values of a particular primary color. In the preferred embodiment, the colors are either positive or zero and the color space is defined in terms of the printing primary colors where one of the axes is the yellow axis, deonted Yel, another axis is the magenta axis, denoted Mag, and the third axis is the cyan axis, denoted Cyan. Any point in the space can be represented as an ordered triplet (Y, M, C) representing the value of the color along the Yel, Mag and Cyan axes, respectively. It should be noted that any other set of information may be used, providing that the set of information is capable of fully defining all colors which are to be reproduced.

In printing, yellow, magenta and cyan inks are deposited on white paper to form resultant colors. In the cartesian space defined above, the origin is the point where no colors are used and hence the resultant is a white "color".

Since equal amounts of each of the primary colors combine to form varying degrees of grayness, the line representing the points at which the yellow, magenta and cyan values are equal, and hence the line along which all gray values are located, is the diagonal line from the origin O of the space to the point at which all three color values are at a maximum, denoted point "MAX". At the point MAX each of the primary color values is at a maximum, and hence a black "color" is the result.

The lines representing equal values of two of the three primary printing colors while the third primary color is equal to zero represent values of secondary printing colors formed by the combination of the respective primary colors. For example, the line defined by the equations: Mag=Cyan, Yel=O represents values of blue, which is formed by a combination of cyan and magenta in the color space.

Similarly, the secondary printing colors green and red are formed by combination of equal values of cyan and yellow or by equal values of yellow and magenta, respectively.

It should be noted that the color space may alternatively be a color space in which colors are subtracted from white to form other colors, similar to the effect perceived when white light is passed through a colored filter. Moreover, the color space may be defined by other than a three-dimensional cartesian coordinate system, e.g., a three-dimensional polar coordinate system.

Color correction may be performed by mapping, converting or transforming the input color space shown in FIG. 3, in which the values from the scanner are represented, to derive an output color space which contains all the corrected color ink values. Such a transformation can be performed by a memory which contains a corrected value for each point in the input space.

However, as noted previously, the input space is divided into 16 major divisions, each of which is divided into 16 minor divisions. Consequently, there is a total of $2^{24}$ points in the input stage, requiring a like number of positions in the memory to provide a corrected color value for each point in the input space. Obviously, such a large memory is quite expensive.

In order to overcome this difficulty, the memory or map table 28 shown in FIG. 1 is loaded with a fraction of the total number of corrected color values, e.g., the corrected values of only those points in the input space which represent the intersections of the planes perpendicular to the 16 major divisions along each axis in the input space. Hence the map table contains 16³ or 4096 memory positions, each of which stores a corrected color value representing a point in the output space and each of which is addressed by a signal representing one of the 4096 points in the input color space.

A corrected color value for a point in the input color space lying between major divisions is derived by using an interpolation process. The process interpolates between corrected color values according to the difference between the input color and several of the closest map table address, as described more fully hereinafter.

It should be noted that a greater or lesser number of points may be stored in the memory 28, with the number of stored points determining the brightness resolution of color reproduction.

In practice, the assembled page to be reproduced is sensed by the scanner 20, which typically works by sensing reflected light from the page and consequently provides color information in terms of the light primaries (or the printing secondaries) of red, green and blue (or R, G, B). This information is subsequently complemented, as defined in connection with FIG. 2, to determine for each pixel the required ink amounts or values of the printing primary colors of yellow, magenta and cyan which, when corrected and reproduced, produce the original color on the resultant image.

The complemented output from the scanner 20 which is stored on the storage disc 22 is typically in the form of a three byte binary code, each byte consisting of 8 bits, which defines the values of the three primary colors of the pixel of the source image.

The color information present on the storage disc 22 is read one pixel at a time to develop a signal denoted INPUT.

Figure 4A:
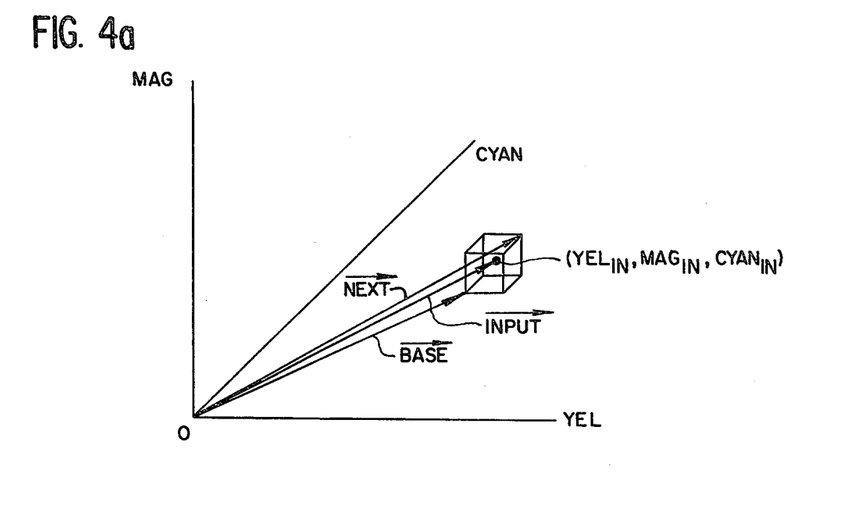
FIG. 4a is a representative diagram similar to FIG. 3 which illustrates the interpolation process used in the present invention.

As shown in FIG. 4a, the signal INPUT may be considered a point in the input space defined by a vector $\overrightarrow{INPUT}$ which begins at the origin and terminates at a point (Yel$_{IN}$, Mag$_{IN}$, Cyan$_{IN}$), where Yel$_{IN}$, Mag$_{IN}$, and Cyan$_{IN}$ are the 8-bit words of the signal.

A signal, called BASE, is generated from the four most significant bits of the signal INPUT by eliminating the four least significant bits thereof. For the purpose of illustrating the interpolation process, a vector called $\overrightarrow{BASE}$ is defined as having three 8-bit components, the four most significant bits of each component being equal to the respective components of the signal BASE, and the four least significant bits thereof being zeroes. The vector $\overrightarrow{BASE}$ may then be considered as extending from the origin $O_{IN}$ of the input space to one corner of a cube which is defined by the eight closest addresses of the map table surrounding the value INPUT. The corner defined by the vector $\overrightarrow{BASE}$ is the corner of the cube closest to the origin $O_{IN}$ and is the memory address next below the signal INPUT.

It should be understood, however, that in the implementation of the interpolation process, the signal BASE along with other signals defined below which are used to address the memory 28 each consist of 4 bits so they combine to make an address of 12 bits.

Alternatively, the memory 28 may contain a different number of stored points, as previously noted, or may utilize a different addressing scheme, such as 3 bit×4 bit×5 bit addresses, as opposed to the 4 bit×4 bit×4 bit addresses defined above.

The vector $\overrightarrow{BASE}$ is then incremented by 16 along each of the three axes to identify a vector, called $\overrightarrow{NEXT}$, which extends from the origin $O_{IN}$ of the input space and terminates at the corner of the above-defined cube farthest away from the origin $O_{IN}$.

Figure 4B:
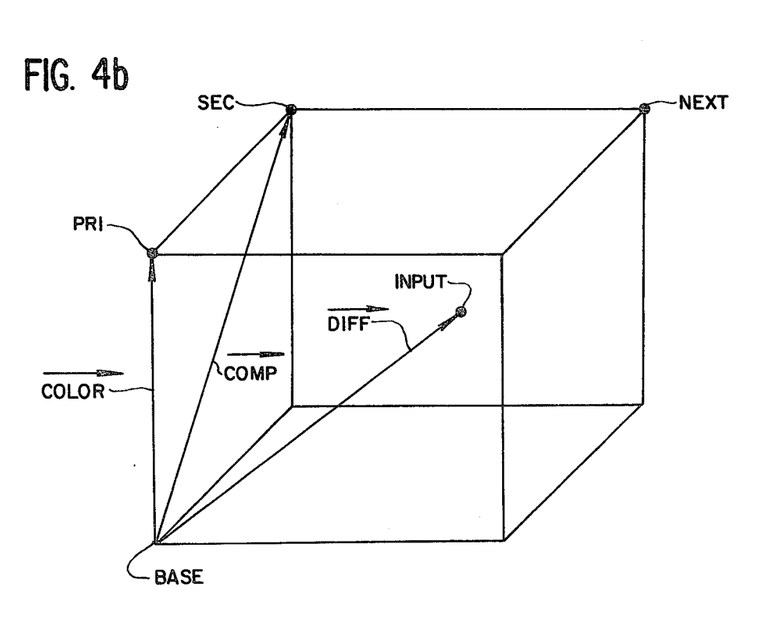

Referring to FIG. 4b, the four least significant bits of each component of the signal INPUT are represented by a vector, called $\overrightarrow{DIFF}$ (difference), which extends from the point BASE to the point INPUT. The components of the vector $\overrightarrow{DIFF}$ represent the distance between these two points along the three axes.

From the vector $\overrightarrow{DIFF}$, a vector called $\overrightarrow{COLOR}$ is defined as follows:

$\overrightarrow{COLOR}$ = (0, 0, 16) if the cyan component is the greatest component of the vector $\overrightarrow{DIFF}$;

= (0, 16, 0) if the magenta component is the greatest component of the vector $\overrightarrow{DIFF}$;

= (16, 0, 0) if the yellow component is the greatest component of the vector $\overrightarrow{DIFF}$.

Moreover, from this determination, a second vector, denoted $\overrightarrow{COMP}$, is defined as follows:

$\overrightarrow{COMP}$ = (16, 16, 0) if the cyan component is the least component of the vector $\overrightarrow{DIFF}$;

= (16, 0, 16) if the magenta component is the least component of the vector $\overrightarrow{DIFF}$;

= (0, 16, 16) if the yellow component is the least component of the vector $\overrightarrow{DIFF}$.

The vectors $\overrightarrow{COLOR}$ and $\overrightarrow{COMP}$ are illustrated in FIG. 4b for the case in which the magenta and cyan components are the highest and next highest components, respectively, of the vector $\overrightarrow{DIFF}$.

The vectors $\overrightarrow{COLOR}$ and $\overrightarrow{COMP}$ are each used to develop signals represented by two further corners of the cube surrounding the value INPUT, in addition to the corners defined by the vectors $\overrightarrow{BASE}$ and $\overrightarrow{NEXT}$, as follows:

PRI = coordinates of ($\overrightarrow{BASE}+\overrightarrow{COLOR}$)

SEC = coordinates of ($\overrightarrow{BASE}+\overrightarrow{COMP}$)

It can be seen that the corner PRI is the coordinants of the corner defined by $\overrightarrow{BASE}$ incremented by 16 in the direction of the axis along which the component of the vector $\overrightarrow{DIFF}$ is at maximum.

Similarly, the corner SEC is the coordinates of the corner defined by $\overrightarrow{BASE}$ incremented by 16 along the two axes along which the highest and next highest components of the vector $\overrightarrow{DIFF}$ occur. In effect, the corner SEC is that corner of the cube defined above which lies in the direction of the complement of the color having the lowest component of the vector $\overrightarrow{DIFF}$, i.e., the corner which lies diagonally across one of the faces of the cube from the point defined by $\overrightarrow{\text{BASE}}$ in a plane perpendicular to the color axis having the smallest component of the vector $\overrightarrow{\text{DIFF}}$.

It can be seen that the corners PRI, SEC and NEXT represent the addresses for the memory 18 which are next above the signal INPUT.

Each of the signals BASE, PRI, SEC and NEXT are used to address the memory. As previously noted, these signals are equal to the four most significant bits of the coordinates of the corners defined by the vectors $\overrightarrow{\text{BASE}}$, $\overrightarrow{\text{COLOR}}$, $\overrightarrow{\text{COMP}}$ and $\overrightarrow{\text{NEXT}}$. In response to this addressing the memory produces the corrected values of yellow, magenta and cyan, along with a fourth color value representing the value of black ink, denoted K, which is added to the three corrected color components. In general, black ink is used to increase the maximum density and to add sharpness to the reproduced colors, in addition to reducing the required quantity of the remaining three inks.

Moreover, the loading of the memory with black ink values allows complete control of the gray scale, thereby eliminating undesirable discontinuities therein which lead to errors in reproduction.

Alternatively, the map table can be loaded to introduce nonlinearities in the color transformation, or even discontinuities, if desired.

The memory produces four output signals, denoted $F_1$, $F_2$, $F_3$ and $F_4$, in response to the addressing thereof by the signals BASE, PRI, SEC and NEXT, respectively. The values $F_1$–$F_4$ are the values in the output space which represent the corrected color values for these corners of the cube. The values stored in the memory are selected to take into account the varying factors involved in the scanning and the printing processes, as noted above. In effect, the memory causes the input values to be mapped into a four valued output space, which represents all of the corrected color values.

Each of the values provided by the memory, i.e., $F_1$, $F_2$, $F_3$ and $F_4$ are then used in a mathematical equation set out in general terms below:

INTERPOLATED COLOR VALUE = ($\text{Yel}_0$, $\text{Mag}_0$, $\text{Cyan}_0$, $K_0$)

where:

$\text{Yel}_0 = (D_1 \text{Yel}_1 + D_2 \text{Yel}_2 + D_3 \text{Yel}_3 + D_4 \cdot \text{Yel}_4) \div 16$ $\text{Mag}_0 = (D_1 \text{Mag}_1 + D_2 \text{Mag}_2 + D_3 \text{Mag}_3 + D_4 \text{Mag}_4) \div 16$ $\text{Cyan}_0 = (D_1 \text{Cyan}_1 + D_2 \text{Cyan}_2 + D_3 \text{Cyan}_3 + D_4 \text{Cyan}_4) \div 16$ $K_0 = (D_1 K_1 + D_2 K_2 + D_3 K_3 + D_4 K_4) \div 16$ and where:

$F_1 = (\text{Yel}_1, \text{Mag}_1, \text{Cyan}_1, K_1)$ = data representing CORRECTED BASE $F_2 = (\text{Yel}_2, \text{Mag}_2, \text{Cyan}_2, K_2)$ = data representing CORRECTED PRI $F_3 = (\text{Yel}_3, \text{Mag}_3, \text{Cyan}_3, K_3)$ = data representing CORRECTED SEC $F_4 = (\text{Yel}_4, \text{Mag}_4, \text{Cyan}_4, K_4)$ = data representing CORRECTED NEXT $D_1 = 16 - C_H$ $D_2 = C_H - C_M$ $D_3 = C_M - C_L$ $D_4 = C_L$ where $C_H$, $C_M$ and $C_L$ are the highest, middle and lowest scalar components, respectively, of the vector $\overrightarrow{\text{DIFF}}$, i.e., of the four least significant bits of the signal INPUT.

It can be seen that the interpolation process involves the vector sum of scaled quantities of vectors in the output space extending from the origin thereof to the points CORRECTED BASE, CORRECTED NEXT, CORRECTED PRI and CORRECTED SEC. By rearranging the equations for $Y_0$, $M_0$, $C_0$, $K_0$, it can be shown that the interpolated color value is derived by a sum of three scaled vectors with the vector extending from the origin to the point CORRECTED BASE. The three scaled vectors are parallel to the following defined vectors:

$\Delta \overrightarrow{\text{CORRECTED NEXT}}$ = the vector from CORRECTED BASE to CORRECTED NEXT;

$\Delta \overrightarrow{\text{CORRECTED PRI}}$ = the vector from CORRECTED BASE to CORRECTED PRI;

$\Delta \overrightarrow{\text{CORRECTED SEC}}$ = the vector from CORRECTED BASE to CORRECTED SEC.

Consequently, the process interpolates between the corrected color values in the map table on the basis of the differences between the input color and the map table addresses for each color component. As a result, the interpolation process allows color reproduction which is optically equivalent to that which can be performed by a system utilizing large memories containing a corrected value for each perceptibly different input color combination.

Figure 5A:
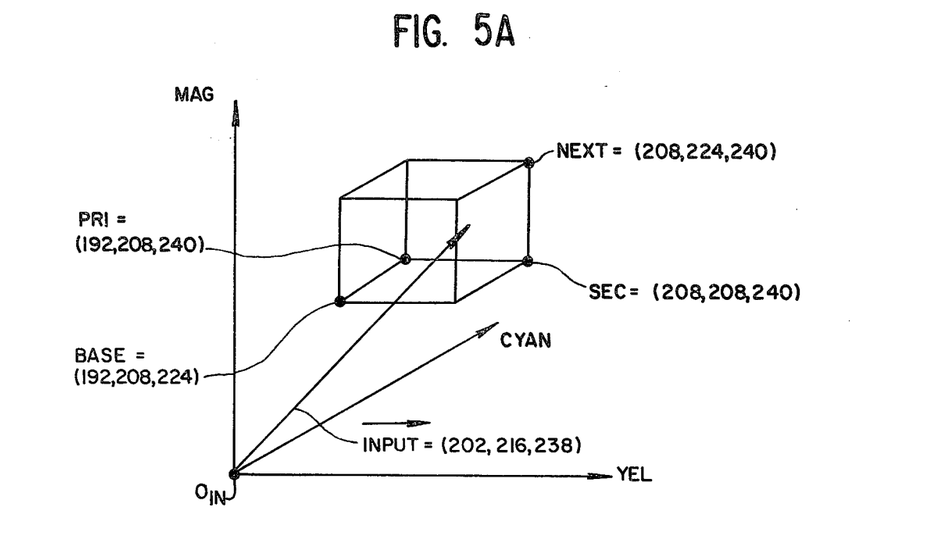
FIG. 5a is a representative diagram similar to FIG. 4a of an example of the interpolation process.
Figure 5B:
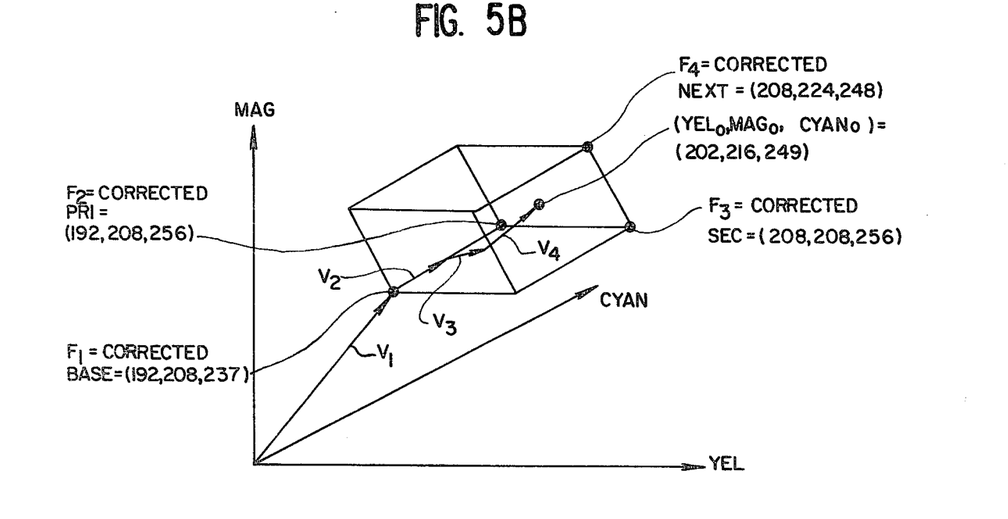

Referring now to FIGS. 5a and 5b, there is illustrated pictorial representations of an input and an output space wherein it is desired to increase in the final printed copy the excess of the cyan component over the next highest component by 50%, when the cyan component is the largest component of the pixel color. Assume that, for purposes of illustration of this example, it is not desired to produce a black ink component K.

As shown in particular in FIG. 5a, assume that the vector $\overrightarrow{\text{INPUT}}$, i.e., the complemented pixel color information, is equal to (202, 216, 238). Replacing the four least significant bits of each word with zeroes yields a value for the vector $\overrightarrow{\text{BASE}}$ of (192, 208, 224).

As before noted, the vector $\overrightarrow{\text{NEXT}}$ is the vector BASE augmented by 16 along each axis, and is therefore equal to (208, 224, 240).

By subtracting $\overrightarrow{\text{BASE}}$ from $\overrightarrow{\text{INPUT}}$, the vector $\overrightarrow{\text{DIFF}}$ is found to be (10, 8, 14), yielding the scalar values of 8, 10 and 14 for $C_L$, $C_M$ and $C_H$ respectively. Furthermore, since the greatest component of $\overrightarrow{\text{DIFF}}$ is the cyan component and the least component of $\overrightarrow{\text{DIFF}}$ is the magenta component, the vectors $\overrightarrow{\text{COLOR}}$ and $\overrightarrow{\text{COMP}}$ are defined as follows:

$\overrightarrow{\text{COLOR}} = (0, 0, 16)$ $\overrightarrow{\text{COMP}} = (16, 0, 16)$ Accordingly, from these vectors, the corners PRI and SEC are defined as follows:

PRI = (0, 0, 16) + (192, 208, 224) = (192, 208, 240)

SEC = (16, 0, 16) + (192, 208, 224) = (208, 208, 240)

Referring to FIG. 5b, the signals BASE, NEXT, PRI and SEC are used to address the memory, which in turn produces output values as follows:

$$F_1 = (192, 208, 232)$$

$$F_2 = (192, 208, 256)$$

$$F_3 = (208, 208, 256)$$

$$F_4 = (208, 224, 248)$$

Note that the cyan component of the points $F_2$ and $F_3$ in the output space are separated by a value of 24 minor divisions from the cyan component of the point $F_1$, which reflects an increase of 50% over the usual 16 minor divisions in the input space by which the cyan components of the points PRI and SEC are separated from the cyan component of the point BASE. Consequently, the cube represented in the input color space is distorted to the form shown in FIG. 5b.

Inserting these values into the equation (1) results in the equation:

$$Yel_0 = [2(192) + 4(192) + 2(208) + 8(208)] \div 16 = 202$$

$$Mag_0 = [2(208) + 4(208) + 2(208) + 8(224)] \div 16 = 216$$

$$Cyan_0 = [2(232) + 4(256) + 2(256) + 8(248)] \div 16 = 249$$

As seen in FIG. 5b, the interpolated color value is visualized as a sum of scaled vectors $\vec{V_1}$, $\vec{V_2}$, $\vec{V_3}$ and $\vec{V_4}$, which are parallel to $\overrightarrow{CORRECTED\ BASE}$, $\overrightarrow{\Delta COR}$-$\overrightarrow{RECTED\ PRI}$, $\overrightarrow{\Delta CORRECTED\ SEC}$ and $\overrightarrow{\Delta COR}$-$\overrightarrow{RECTED\ NEXT}$, respectively.

Figure 6:
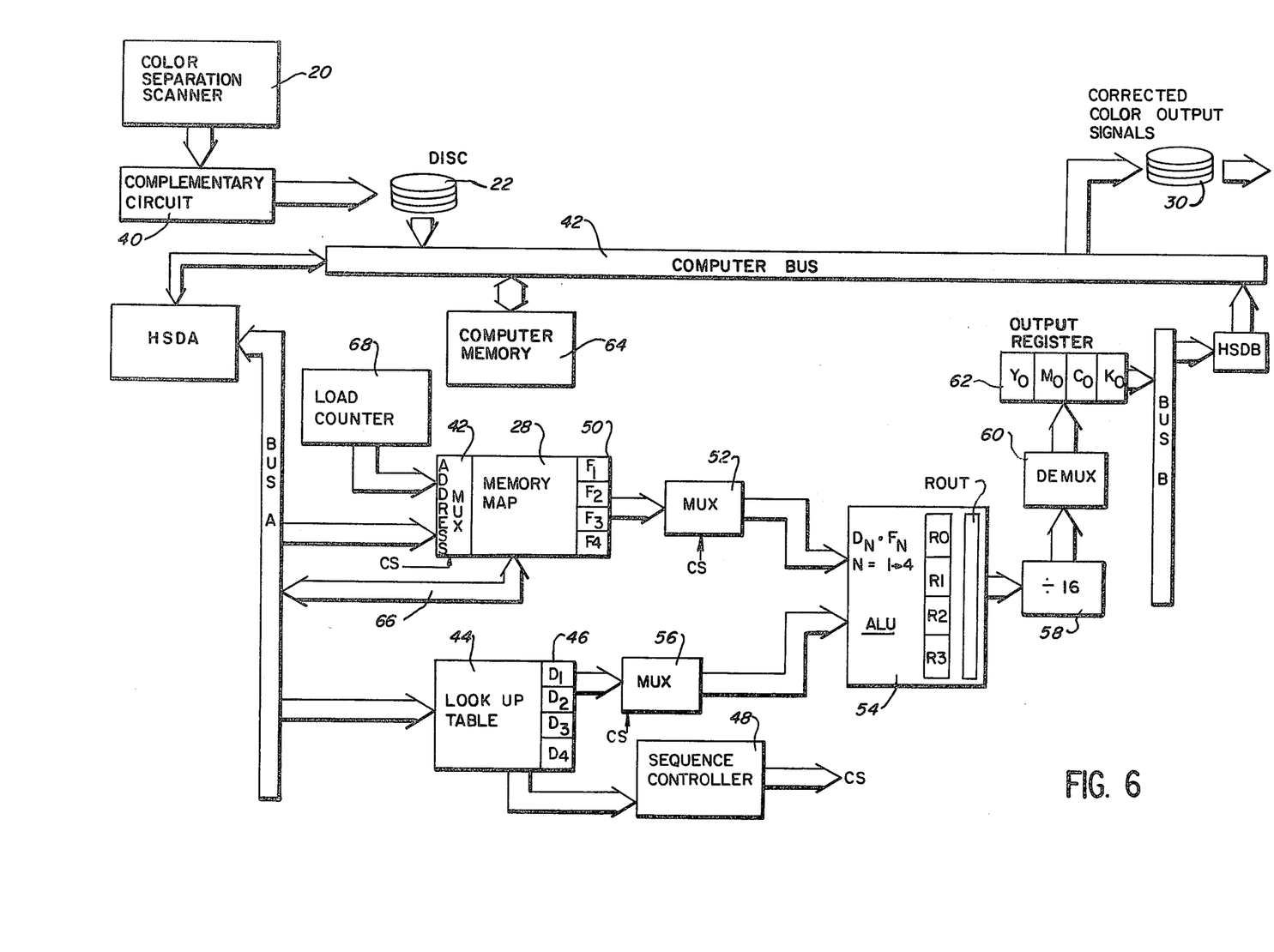
FIG. 6 is a schematic block diagram of the color corrector shown generally in block form in FIG. 1.

Referring now to FIG. 6, there is illustrated a detailed block diagram of the color corrector 24 illustrated in FIG. 1.

The scanner 20 develops a 32-bit signal for each pixel consisting of three 8-bit words denoting red, green and blue information and a fourth 8-bit word used in representing black type matter. With colors other than black, the fourth word is all ones. The 32-bit signal is complemented in a complementing circuit 40 which in turn develops yellow, magenta and cyan information which is stored on the disc 22. The fourth word becomes zeroes for a color image and does not affect the interpolation process.

The disc 22, under control of a computer (not shown), provides the 32-bit complemented word INPUT through a computer bus 42, a high speed data interface HSDA and a bus A to the memory 28.

The four most significant bits of each word of INPUT is used to address the memory 28. The memory 28 includes an address multiplexer 42 which converts the three 4-bit words into a form usable by the memory.

The four least significant bits of each word of the signal INPUT is used to address a lookup table 44 which contains 4096 memory positions. As previously noted, the four least significant bits of each word of INPUT represents the vector $\overrightarrow{DIFF}$ and this addressing results in a determination of the high, mid and low valued signal components $C_H$, $C_M$ and $C_L$.

The addressing of the lookup table by the four least significant bits results in the transfer of the values $D_1$-$D_4$, calculated from the values $C_H$, $C_M$ and $C_L$, to a latch 46, which is a part of the lookup table 44. The values $D_1$-$D_4$ are stored in each memory position and are each 5-bit values which represent any number between zero and 16.

The addressing of the lookup table 44 also causes a 3-bit number to be produced which determines and identifies the colors having the highest, least and middle components of the four least significant bits. This 3-bit number is coupled to a sequence controller 48 which in turn generates a control signal CS which controls various other components in the circuit.

In the preferred embodiment, the sequence controller 48 is implemented by suitably programming an Am2910 Microprogrammer Controller, manufactured by Advanced Micro Devices, Inc., and which is an address sequencer for controlling the sequence of execution of microinstructions stored in a microprogram memory. The microprogram may be stored in an external memory, such as a PROM (not shown). A descriptive listing of the microprogram for the interpolation process is given in an Appendix to this specification.

The accessing of the memory map 28 is controlled by the sequence controller 48 through the control signal CS. The four most significant bits of each byte of the input signal combine to form the base memory address next below the signal INPUT which is first used to address the memory 28, which determines the base output signal $F_1$ representing the point CORRECTED BASE, and transfers this signal to a latch 50 which is a part of the memory map 28.

As previously noted, the four most significant bits of each byte of the signal INPUT are equal to the signal BASE. Therefore, in order to generate the address for the output value $F_2$, the address for the output $F_1$ is incremented by one (instead of 16), under control of the signal CS, in the component thereof which corresponds to the largest component of the four least significant bits of the signal input. In other words, the address represented by the vector $\overrightarrow{BASE}$ must be incremented as follows:

$$\frac{\overrightarrow{BASE}}{16} = \text{address for } F_1$$

$$\text{address for } F_2 = \text{address for } F_1 + \frac{\overrightarrow{COLOR}}{16}$$

where $\overrightarrow{COLOR}$ is the vector representing the increment to a next higher address in the direction of the highest component of the vector $\overrightarrow{DIFF}$, as previously noted.

Similarly, the address for $F_1$ is incremented by the control signal CS to generate the following addresses for $F_3$ and $F_4$:

$$\text{address for } F_3 = \text{address for } F_1 + \overrightarrow{COMP}/16$$

$$\text{address for } F_4 = \text{address for } F_1 + (1, 1, 1)$$

where $\overrightarrow{COMP}$ is the increment to the next higher address in the direction of the highest and next highest components of the vector $\overrightarrow{DIFF}$, as previously noted.

To facilitate the use of existing memory devices, the three 4-bit numbers are joined together to form a single 12-bit number which is accepted by the memory as a unique address.

The addressing of the memory by these additional signals determined in accordance with the control signal CS results in the determination of the corresponding output signals $F_2$-$F_4$ which are stored in the latch 50 with the output $F_1$ as 8-bit numbers. These output signals are coupled to an ALU 54 through a multiplexer 52.

The ALU 54 also receives the values $D_1-D_4$ from the latch 48 through a multiplexer 56. The multiplexers 52 and 56 are also controlled in accordance with the control signal CS to allow the ALU 54 to perform operations in proper order.

The ALU 54 multiplies the values $D_1-D_4$ with the values $F_1-F_4$ according to the relation:

$$D_N \times F_N$$

where N=1–4

The ALU 54 contains a set of internal registers R0–R3 which store various intermediae values during the course of a microprogram execution and an output register $R_{OUT}$ which stores the final values.

In the preferred embodiment, the ALU 54 is implemented by using four AM 2901B 4-bit bipolar microprocessor slices in conjunction with an AM2902A high speed look ahead carry generator and a 255557 high speed 8×8 bit multiplier, all of which are manufactured by Advanced Micro Devices, Inc.

The ALU 54 interpolates between output signals for the memory addresses below and above the signal INPUT in accordance with the signals $D_1-D_4$ to establish three output signal increments which are summed with the base signal output $F_1$. The first output signal increment is determined by multiplying the low valued input difference signal component $C_L$ with the output signal $F_4$ representing the vector $\overrightarrow{\Delta CORRECTED\ NEXT}$. The second output signal increment is determined by multiplying the quantity $(C_M - C_L)$ with the output signal $F_3$ representing the vector $\overrightarrow{\Delta CORRECTED\ SEC}$ which is the vector in the plane of the high and mid valued components of the vector $\overrightarrow{DIFF}$. The third output signal increment is determined by multiplying the quantity $(C_H - C_M)$ with the output signal $F_2$ representing the vector $\overrightarrow{\Delta CORRECTED\ PRI}$ which is the vector along the axis of the highest valued component of the vector $\overrightarrow{DIFF}$.

The final values stored in the registers R0–R3 are then divided by 16 in a divider circuit 58, which may simply drop the four least significant bits therefrom. These values are then transferred through a demultiplexer 40 to an output shift register 62 which stores the interpolated color value.

The contents of the output shift register 62 are transferred under computer control through a bus B, a high speed data interface HSDB and the computer bus 42 to the storage disc 30 illustrated in FIG. 1.

As previously noted, the information stored on disc 30 is used to control a cylinder engraver 32, or may be used as an input to a color printer 34 or cathode ray tube 36, as desired.

The descriptive listing shown in the Appendix details the control of the ALU 54 by the sequence controller 48. The ALU 54 multiplies the individual color components of $F_1-F_4$ with the values $D_1-D_4$ as follows:

$$16\ Y_0 = \sum_{n=1}^{4} F_N(Yel)D_N \qquad \text{where } F_N(Yel) \text{ is the Yellow component word of } F_N$$

$$16\ M_0 = \sum_{n=1}^{4} F_N(Mag)D_N \qquad \text{where } F_N(Mag) \text{ is the Magenta component word of } F_N$$

$$16\ C_0 = \sum_{n=1}^{4} F_N(Cyan)D_N \qquad \text{where } F_N(Cyan) \text{ is the Cyan component word of } F_N$$

$$16\ K_0 = \sum_{n=1}^{4} F_N(black)\ D_N \qquad \text{where } F_N(black) \text{ is the black component word of } F_N$$

As previously noted, the output of the ALU 54 is divided by 16 in the divider circuit 58 to generate the values $Y_0, M_0, C_0, K_0$.

As noted in the co-pending application referred to above, the memory map 28 may be loaded with appropriate corrected color values under control of a general purpose computer (not shown) which includes a computer memory 64 and the computer bus 42. The appropriate values to be stored in the various memory positions of the memory map 28 may be stored in the computer memory 64 and may be transferred, under computer control, through the high speed data interface HSDA, the bus A and a series of read/write map I/O lines 66 into the appropriate positions in the memory 28. A load counter 68 sequentially controls the accessing of the memory 28 so that the values stored in the computer memory 64 are placed in the appropriate memory positions within the map 28.

It should be noted that the output values originally stored in the computer memory 64 may be generated by the general purpose computer, or may be externally generated and placed directly into the map 28.

APPENDIX

Address memory using 4 LSB's of INPUT;
Multiply $F_1(Yel) \times D_1$;
Address memory using address for $F_2$, multiply $F_1(Mag) \times D_1$ and store $F_1(Yel) \times D_1$ in $R_0$;
Multiply $F_1(Cyan) \times D_1$ and store $F_1(Mag) \times D_1$ in $R_1$;
Multiply $F_1(Black) \times D_1$ and store $F_1(Cyan) \times D_1$ in $R_2$;
Multiply $F_2(Yel) \times D_2$ and store $F_1(Black) \times D_1$ in $R_3$;
Address memory using address for $F_3$, multiply $F_2(Mag) \times D_2$, add $F_2(Yel) \times D_2$ to previous product in $R_0$ and store in $R_0$;
Multiply $F_2(Cyan) \times D_2$, add $F_2(Mag) \times D_2$ to previous product in $R_1$ and store in $R_1$;
Multiply $F_2(Black) \times D_2$, add $F_2(Cyan) \times D_2$ to previous product in $R_2$ and store in $R_2$;
Multiply $F_3(Yel) \times D_3$, add $F_2(Black) \times D_2$ to previous product in $R_3$ and store in $R_3$;
Address memory using address for $F_4$, multiply $F_3(Mag) \times D_3$, add $F_3(Yel) \times D_3$ to contents of $R_0$ and store in $R_0$;
Multiply $F_3(Cyan) \times D_3$, add $F_3(Mag) \times D_3$ to contents of $R_1$ and store in $R_1$;
Multiply $F_3(Black) \times D_3$, add $F_3(Cyan) \times D_3$ to contents of $R_2$ and store in $R_2$;
Multiply $F_4(Yel) \times D_4$, add $F_3(Black) \times D_3$ to contents of $R_3$ and store in $R_3$;
Multiply $F_4(Mag) \times D_4$, add $F_4(Yel) \times D_4$ to contents of $R_0$ and put result 16 $Yel_0$ into $R_{OUT}$;
Multiply $F_4(Cyan) \times D_4$, add $F_4(Mag) \times D_4$ to contents of $R_1$ and put result 16 $Mag_0$ into $R_{OUT}$;
Multiply $F_4(Black) \times D_4$, add $F_4(Cyan) \times D_4$ to contents of $R_2$ and put result 16 $Cyan_0$ into $R_{OUT}$;
Add $F_4(Black) \times D_4$ to contents of $R_3$, put result of $16K_0$ into $R_{OUT}$.

We claim:

1. In the conversion of a color image from one color space to another color space including the steps of providing a three dimensional input signal representing the color of a pixel of said image in said one space and providing a memory with a finite number of three dimensional addresses representing colors in said one space, said memory having at each address output signals representing the corresponding color in said other space, an improved method of interpolating to determine the output signals for pixel color input signals between two memory addresses, comprising:

determining the base output signals for the base memory address next below said input signals;

determining the high, mid and low valued input signal components representing the difference between the pixel color input signal and the base memory address below the input signal;

determining additional signals for memory addresses next above said input signals in accordance with said high, mid and low valued input difference signal components;

interpolating between output signals for the memory addresses below and above the input signal in accordance with the low valued input difference signal component to establish a first output signal increment from said base output signals;

interpolating between output signals for the memory addresses below and above the input signal in the plane of the mid and high input difference signals in accordance with the excess of the mid valued input difference signal component over the low valued input difference signal component to establish a second output signal increment from said base output signals;

interpolating between output signals representing memory addresses below and above the input signal along the axis of the high valued input difference signal component in accordance with the excess of the high valued input difference signal component over the mid valued input difference signal components to establish a third output signal increment from said base output signals; and summing the base output signals with said first, second and third output signal increments to generate output signals representing the color of said pixel in said other color space.

2. The interpolation method defined in claim 1 in which said three dimensional input signal is a multi-bit binary digital signal.

3. The interpolation method of claim 2 in which said input signal has for each dimension a plurality of most significant bits and a plurality of least significant bits;

said base output signals are determined for an address defined by the most significant bits;

the additional output signals are determined for addresses defined by the least significant bits; and the interpolations are performed in accordance with said least significant bits.

4. The interpolation method of claim 3 in which said three dimensional input signal has three bytes of 8 bits each, 4 bits of each byte being the most significant bits and 4 bits of each byte being the least significant bits.

5. The interpolation method of claim 1 in which said three dimensional input signal represents the color of a pixel as a function of red, green and blue components.

6. The interpolation method in claim 1 in which the output signals at each memory address represent color in terms of yellow, magenta and cyan components.

7. The improved interpolation method of claim 1 in which said three dimensional input signal represents the color of a pixel as a function of red, green and blue components and in which the output signals at each memory address represent color in terms of functions of yellow, magenta and cyan components.

8. The interpolation method of claim 1 in which the input signals are derived by scanning copy.

9. The interpolation method of claim 1 in which printing plates are prepared in accordance with the output signals, representing the color of each pixel in said other color space.

10. The interpolation method of claim 1 in which the input signals are derived by scanning copy and printing plates are prepared in accordance with the output signals, representing the color of each pixel in said other color space.

11. The interpolation method of claim 8 in which said three dimensional input signal is stored prior to performance of the interpolation.

12. The interpolation method of claim 1 in which said output signals are stored subsequent to the summation step and thereafter the printing plates are prepared.

13. The interpolation method of claim 8 in which said three dimensional input signal is stored prior to performance of the interpolation and said output signals are stored subsequent to the summation step and thereafter the printing plates are prepared.

14. The interpolation method of claim 1 in which a cathode ray tube is driven in accordance with the output signals representing the color of each pixel in said other color space to provide a display of said image.

15. The interpolation method of claim 1 in which a color printer is driven in accordance with the output signals representing the color of each pixel in said other color space to provide a print of said image.

* * * * *